United States Patent [19]
Miller et al.

[11] 3,916,406
[45] Oct. 28, 1975

[54] JAMMING CANCELLATION DEVICE

[75] Inventors: William S. Miller; George H. Edwards, both of Hyattsville, Md.

[73] Assignee: The United States of America as represented by the Secretary of the Navy, Washington, D.C.

[22] Filed: Feb. 20, 1963

[21] Appl. No.: 260,950

[52] U.S. Cl. ................. 343/7 A; 325/65; 343/18 E
[51] Int. Cl.²... G01S 7/36; G01S 9/02; H04B 15/00
[58] Field of Search........ 343/18, 7, 17.1; 325/13 L, 325/473, 132, 65, 51, 131, 323, 324

[56] References Cited
UNITED STATES PATENTS

| | | | |
|---|---|---|---|
| 2,209,273 | 7/1940 | Hills | 325/131 |
| 2,538,028 | 1/1951 | Mozely | 343/17.1 |
| 2,694,140 | 11/1954 | Gilman et al. | 325/65 |
| 2,910,691 | 10/1959 | Rhyins | 343/7 |
| 3,001,064 | 9/1961 | Alexis et al. | 325/65 |
| 3,050,726 | 8/1962 | Laurent | 343/17.1 |
| 3,079,600 | 2/1963 | Dahlin | 343/17.1 |
| 3,082,418 | 3/1963 | Milosevic | 343/17.1 |

Primary Examiner—Malcolm F. Hubler
Attorney, Agent, or Firm—R. S. Sciascia; Q. Baxter Warner; J. E. Snead

EXEMPLARY CLAIM

1. In a system for decreasing the effect of interference signals on radar operation, the combination comprising;
   interference signal detection means having a long response time to incoming signals,
   transmitter-receiver frequency slew means,
   trigger means electrically connected to the output of said interference signal detection means and adapted to actuate said frequency slew means upon receipt of predetermined level of output from said detection means,
   timing means electrically connected to be actuated by said trigger means for controlling the time of operation of said frequency slew means, and
   free-running multi-vibrator means electrically connected to and adapted to cooperate with said timing means to control the operation of said frequency slew means,
   whereby said automatic frequency slew means is actuated upon recipt of an effective interference signal, and operates to change the frequency of said transmitter-receiver to eliminate the effect of interference signals.

16 Claims, 6 Drawing Figures

INVENTORS
WILLIAM S. MILLER
GEORGE EDWARDS

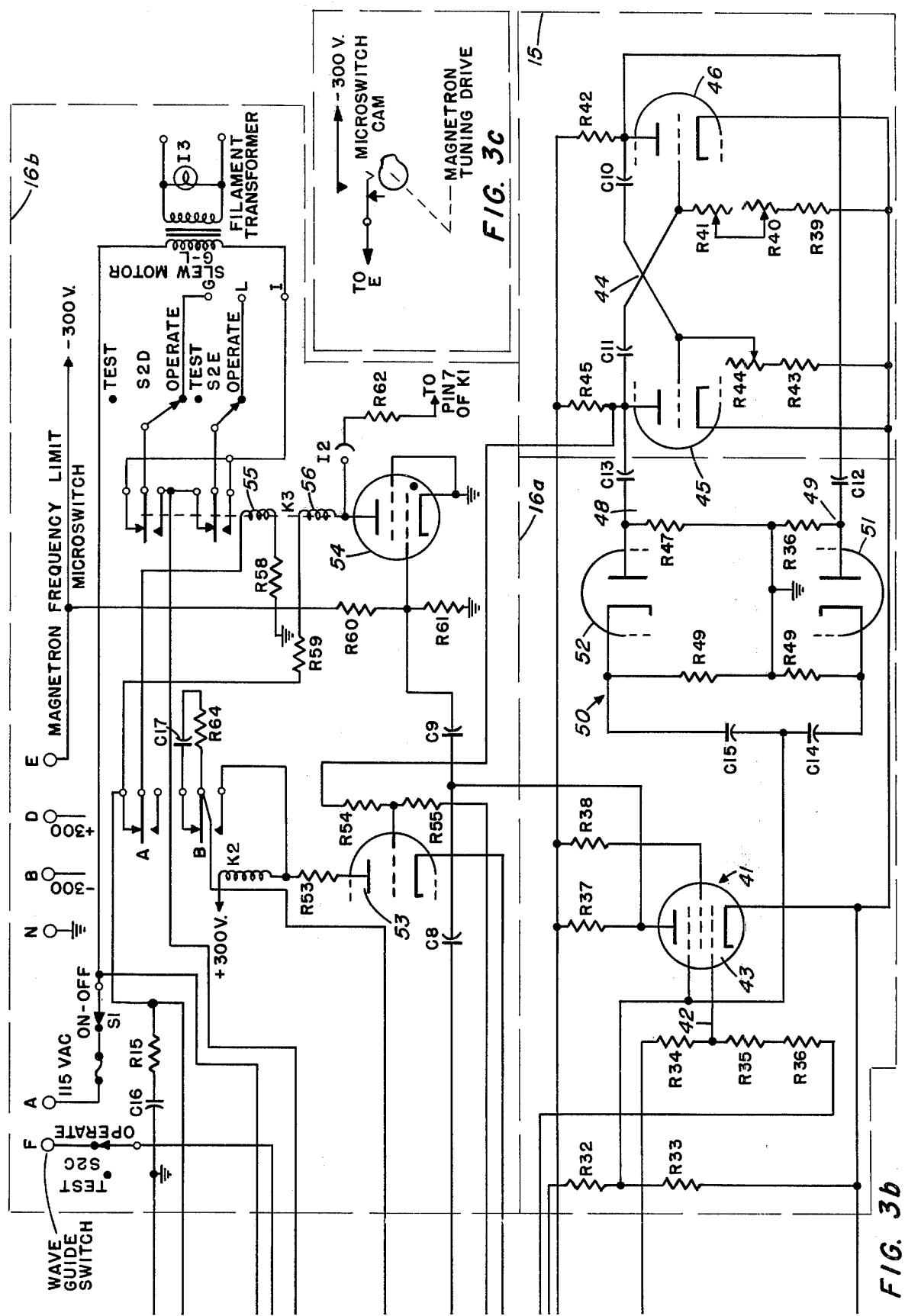

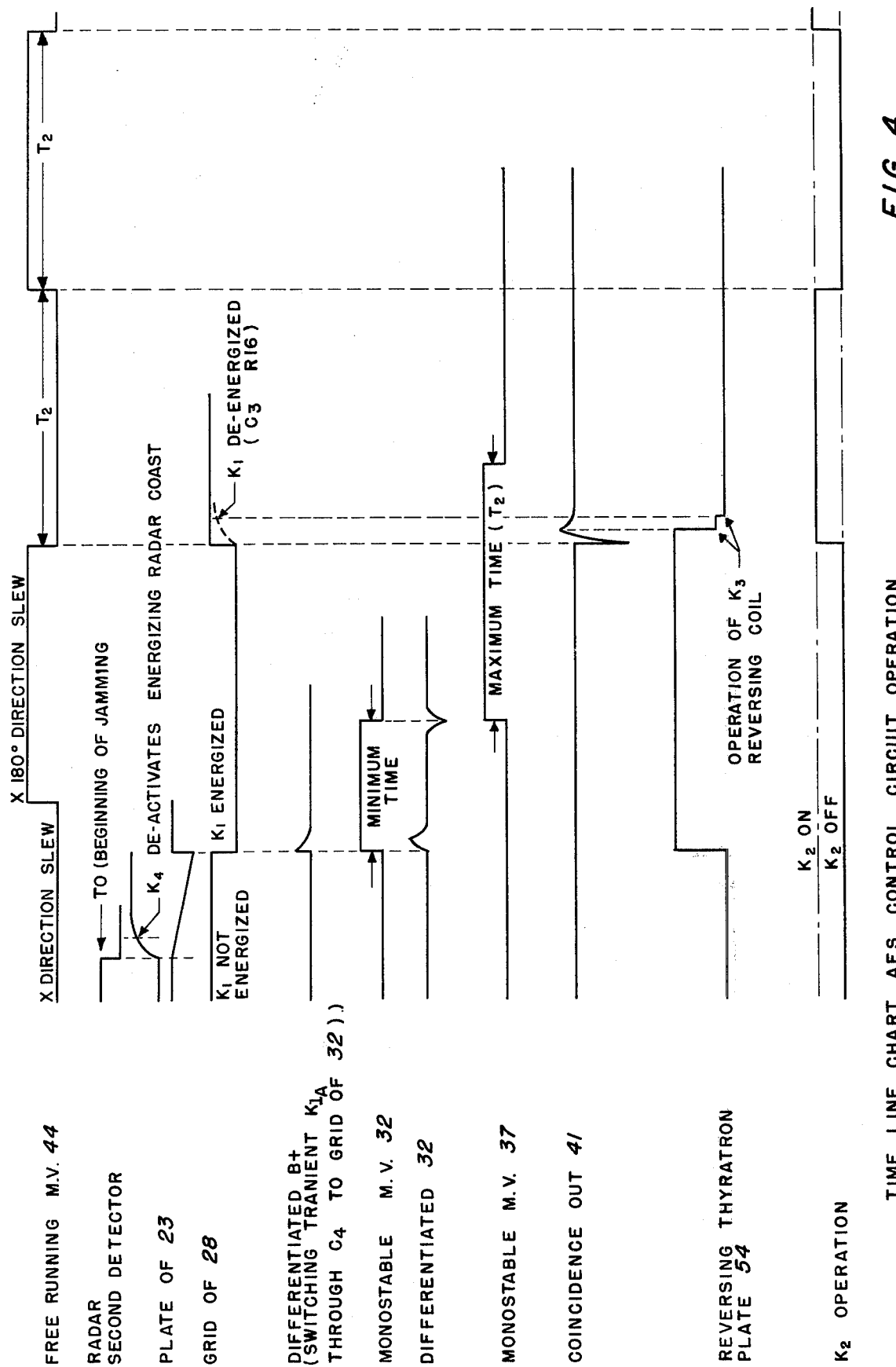

JAMMING CANCELLATION DEVICE

The present invention relates to a means for decreasing the effect of a jamming signal input to a radar. More particularly, the present invention relates to an automatic frequency slew system for changing the frequency of a radar receiver-transmitter to eliminate the effects of jamming signals.

A serious problem in radar operation, particularly in the field of search-track radar system, where it is necessary to maintain radar contact with an object being tracked, is the probability of jamming signals at the input to the system.

Various jamming cancellation devices have been conceived, but for many different reasons these devices have failed to achieve effective elimination of interferences in the radar receiver. Some radars are designed to allow the operator to change the frequency of the transmitter-receiver when objectionable interference is encountered. However, it is well-known that human reaction time is too slow to prevent loss of automatic tracking when a target is obscured by interference. Other mechanical or electromechanical systems of the prior art have been demonstrated to be inadequate to either prevent loss of contact with the target, or to render the transmitter-receiver insensitive to either effective swept type or continuous type jamming signals. Therefore, there has been a need for automatic control of jamming cancellation to prevent or minimize loss of the target in automatic tracking functions.

It is an object of the present invention to provide a jamming cancellation system to eliminate or minimize the effect of jamming signals on radar operation.

It is another object of the present invention to provide a system for rendering a radar transmitter-receiver insensitive to jamming signals immediately upon receipt of such signals and to preserve the track information during the insensitive period.

A further object of the present invention is to provide an automatic frequency slew system to prevent loss of target track information under jamming conditions which system detects and analyzes the jamming signal and changes the frequency of the transmitter-receiver to render the jamming signal ineffective.

Another object of the present invention is to place the radar in a closed loop memory mode of operation immediately upon receipt of a jamming signal to preserve target positional information sufficiently long for interference analysis and transmitter-receiver frequency changing operations to take place.

Still another object of the present invention is to provide an automatic frequency slew circuit control system for a radar to detect, analyze, and render the transmitter-receiver of the radar insensitive to jamming signals, while at the same time preserving the track information during the frequency changing operation.

The present invention is designed to detect radar jamming, and to eliminate jamming interference with normal operation. Generally, the present invention performs four functions, that is, to detect interference, to actuate interference reduction equipment, to time the frequency slew, and to differentiate between active and inactive jamming. The automatic frequency slew (AFS) system control circuit of the present invention is composed of nine vacuum tubes, four relays, and associated parts and circuitry. The AFS system performs the following functions:

1. Place the radar in coast upon detection of a predetermined level of electronic jamming. This function enables the radar to continue its normal operation in the event the interference is determined to be ineffective, and to eliminate any merely periodic interferences.
2. Wait a selected time interval to determine if the jamming is spot or an effective swept type.
3. If the jamming is swept at an ineffective rate, the radar merely tracks normally and is placed in coast only during the momentary intervals in which the jammer is in frequency coincidence with the radar receiver system.
4. If the jamming is spot or swept at an effective rate, the following operations are performed:
   a. The magnetron is isolated so that no detectable amount of energy is radiated into space.
   b. The radar coast and automatic tracking indicator (ATI) relays are held in the manner required to produce radar coast.
   c. The magnetron frequency is changed by slewing the magnetron tuning driving motor in a random direction for an interval of time.
   d. At the end of the slewing interval, a braking torque is applied to the magnetron slew motor and the radar is returned to normal operation.
5. Should the magnetron approach its frequency limits during any slew interval, the frequency slew direction will be automatically reversed. In this event, the frequency slew motor is not braked when the radar is again allowed to transmit. This lack of braking will return the operating frequency further from the frequency limits to allow continued random operation. This does not sacrifice tracking information nor does it reduce the ability of the AFS operation to actuate again at any time.

A better understanding of the present invention may be obtained by referring to the figures and their accompanying detailed description wherein.

Figure 3A:
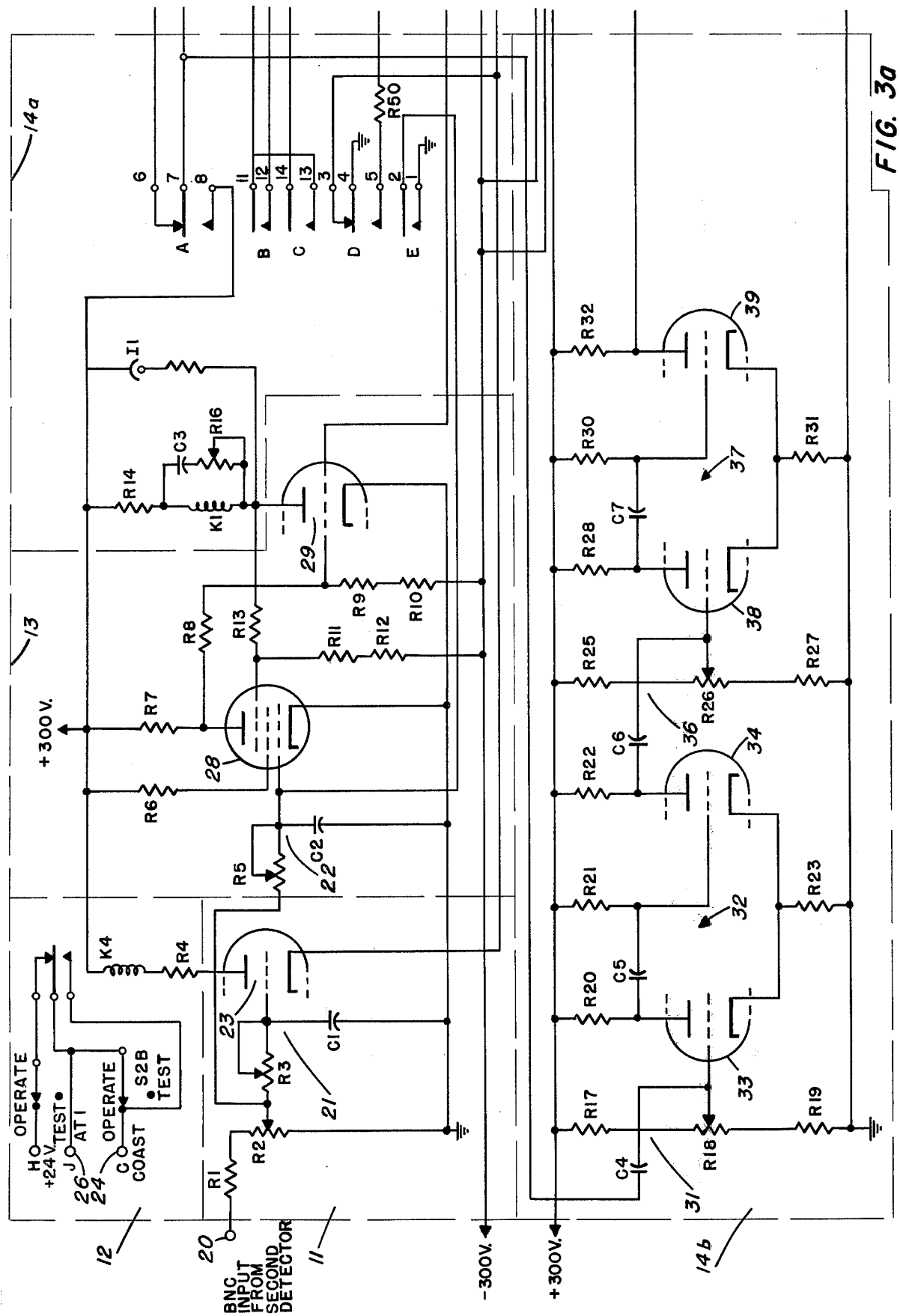

FIGS. 3a and b are schematic circuit diagrams of the AFS control circuitry;

FIG. 3c is a schematic representative of the switching circuit for the magnetron tuner;

FIG. 4 is a time line chart showing the operating voltage of the various parts of the AFS circuitry.

Figure 1:
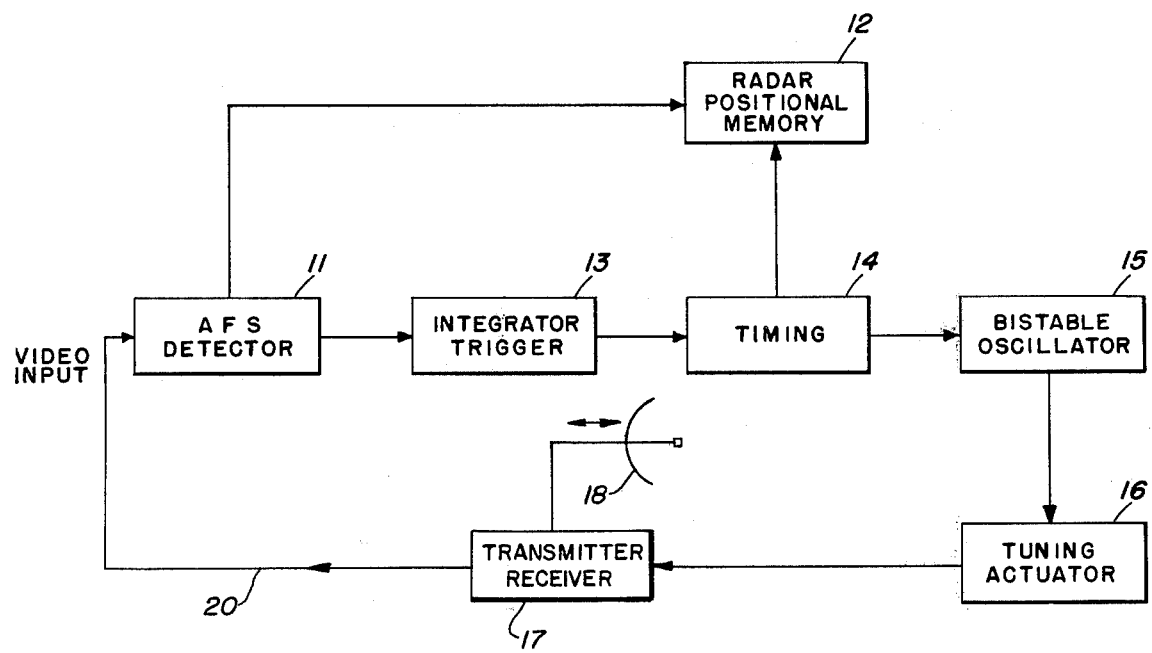
FIG. 1 is a simplified block diagram of the AFS control circuitry.

Referring to FIG. 1 there is shown a simplified block diagram of the AFS circuitry. This block diagram shows a video input 20 to an AFS detector 11. The video input may come from an auxiliary circuit, from the radar IF amplifier, or from the radar second detector, shown generally from the transmitter-receiver 17 which transmits and receives signals to and from the antenna 18. The AFS detector 11 averages the jamming power in the relay circuit, and actuates radar positional memory circuit 12. AFS detector 11 is also coupled to an integrator-trigger 13 which actuates a timing circuit 14 which is in turn coupled, electrically, to a bistable oscillator 15. Bistable oscillator 15 actuates a tuning actuator 16, which is coupled to the radar transmitter-receiver 17.

In operation, the radar interference signal is coupled from video input 20 from the transmitter receiver 17 to AFS detector 11. Detector 11 measures the average power of the interference in an integrating circuit to be hereinafter more particularly described, and, if a predetermined threshold is exceeded, integrator-trigger 13 is actuated. Integrator-trigger circuit 13 begins the frequency slew function, whereby the output of trigger 13 actuates timing circuit 14 which can be mechanical, electro-mechanical, or electronic in nature. As will be seen in the following disclosure, the circuit disclosed in the present invention is electronic in nature. It should be noted that detector 11 also actuates radar positional memory circuit 12 upon receipt of an interference signal of sufficient magnitude. At the end of the timing cycle after frequency slew has been accomplished, timing circuit 14 de-energizes radar positional memory circuit 12, and the radar is returned to normal operation.

The beginning of the timing cycle interrupts a bistable free-running oscillator 15 which may also be mechanical, electro-mechanical, or electronic. Again, the disclosed circuit is electronic. Interruption of oscillator 15 sets it into one of its two states, each state representing one of the directions in which an actuator 16 controls the tuning of the transmitter frequency. "Direction," in this instance, refers to increasing or decreasing the frequency of the transmitter-receiver 17.

The timing device 14 controls the length of time for which the timing actuator 16 functions. This determines the amount of change in transmitter frequency, according to the rate of transmitter tuning for a particular radar. Several cycling times may be obtained from the timer which can be preprogrammed to select certain intervals, or a random program may be set up to select irregular intervals.

Figure 2:
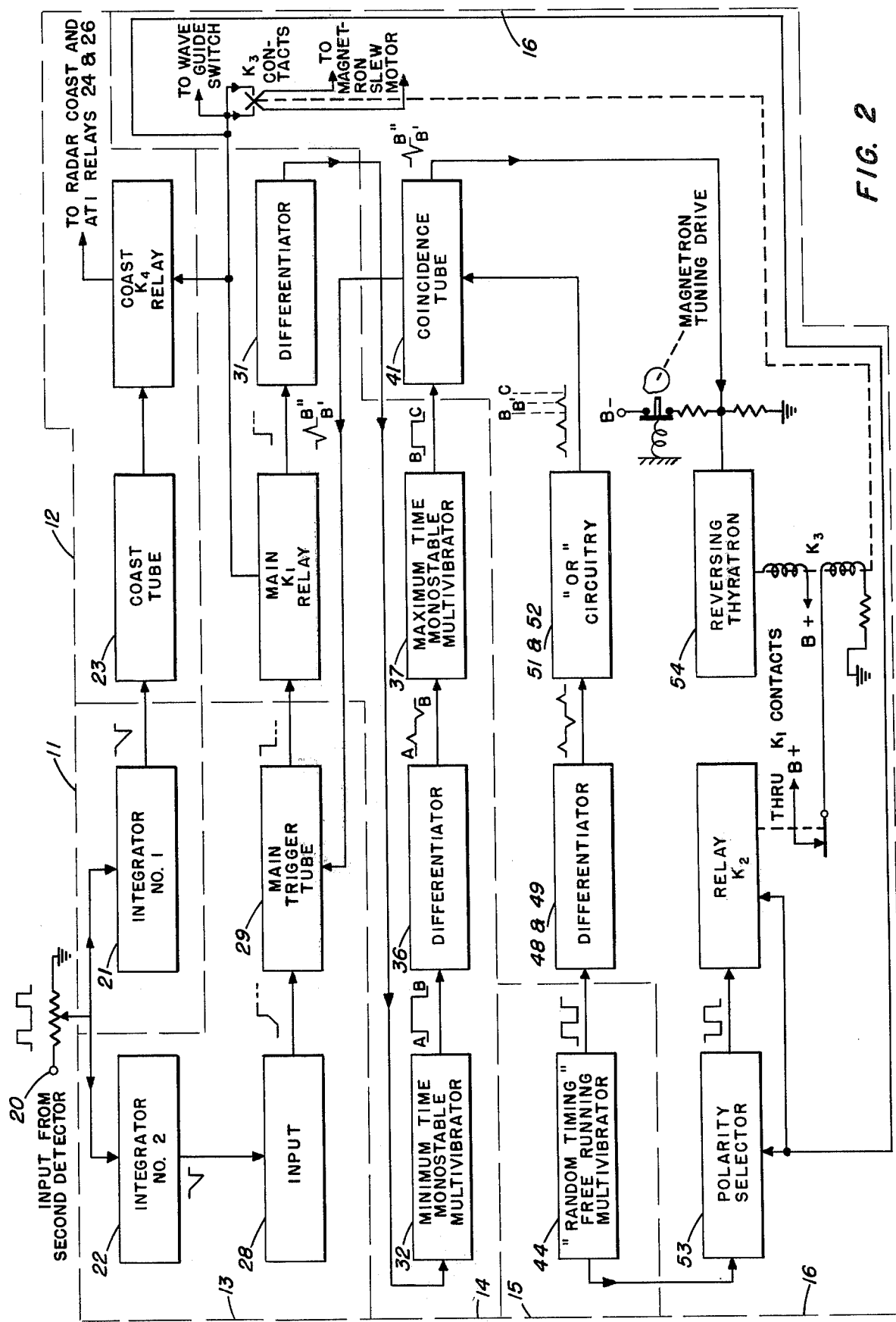
FIG. 2 is a more detailed block diagram showing more of the AFS circuitry.

Reference is now made to FIG. 2 and FIGS. 3a and 3b for a more detailed description of the present invention. As can be seen, the video input 20 from the radar second detector is coupled into a circuit which is shown in block diagram form in FIG. 2 and in schematic form in FIGS. 3a and 3b. The portions of the circuit represented by the blocks in FIG. 1 have been designated by their respective numbers in FIGS. 2 and 3a and 3b, so that like numbers represent like portions of the blocks shown in FIG. 1. The following description of the detailed AFS control circuitry will be made with reference to FIGS. 2 and 3a and 3b.

The input 20 to the AFS control circuitry is divided and coupled into a first integrator 21 and a second interator 22. The reason for provision of a first and a second integrator is as follows:

Under normal radar receiver operation, the action of the automatic gain control (AGC) prevents any significant increase in the average receiver current under jamming conditions. Since the operation of AFS depends on an average increase in radar second detector current, it it necessary to reduce the effect of AGC on the radar receiver under jamming conditions. This reduction is accomplished by designing the first integrator 21 as a fast time constant (FTC) shaping network in series with the received signal line. The effect of this FTC network is to prevent the development of an AGC voltage on the lower frequency components of jamming while having little effect on the development of AGC on the higher frequency components of a discrete target pulse. With this type of AGC control, the average change in receiver current due to jamming varies as a function of the jamming to gated target power ratio rather than in proportion to the jamming power alone.

As may be seen in FIG. 3a, the receiver unblanked voltage pulses are applied through an isolation resistor $R_1$ and a level control resistor $R_2$ to the first integrator 21 and second integrator 22. First integrator 21 consists of resistor $R_3$ and capacitor $C_1$, which average the negative unblank pulses received from the radar second detector. First integrator 21 is designed to have a fast time constant to decrease the effect of AGC on jamming signals. Second integrator 22 consists of resistor $R_5$ and capacitor $C_2$. Integrator 22 has a slow time constant relative to integrator 21 so that it will trigger the timing circuit in the manner to be hereinafter more particularly described only if the jamming is at an effective rate. The average voltage level from integrator 21 is coupled to the grid of vacuum tube 23, to thereby control the current flow through the tube. The current flow through tube 23 excites relay coil $K_4$, so that at some predetermined level of average voltage from integrator circuit 21 applied to the grid tube 23, the current at the plate of tube 23 will be reduced sufficiently to cause deactivation of relay $K_4$. Relay $K_4$ in turn controls the radar coast and ATI relays 24 and 26 which in turn initiate radar coast. As shown in FIG. 3a, relay $K_4$ is inactivated so that the radar coast and ATI relays are connected to a 24 volt power source. When relay $K_4$ is activated, the radar coast and ATI radars are disconnected from the power source.

The fast time constant integrator 21 and its accompanying circuitry provides the radar with a rapid action coast feature which enables the radar to preserve its tracking information at the onset of jamming. This circuitry further provides for a delay in activation of the AFS operation sufficiently long to determine if the jamming is effective.

The second integrator circuit 22 shown in FIGS. 2 and 3a is designed to have a slow time constant relative to first integrator 21 and is designed to trigger a modified Eccles-Jordan multi-vibrator to achieve activation of the timing circuit. The output of integrator 22 is connected to the grid of pentode 28, which forms one tube of the modified Eccles-Jordan circuit. The other tube in the circuit is triode 29 whose grid is connected to the plate of pentode 28. Prior to the onset of jamming pentode 28 is the conducting stage, and triode 29 is biased to cut-off. When effective jamming is impressed on integrator 22, triode 29 is biased to conduct, and the tubes and their accompanying circuitry form a bistable multi-vibrator. Pentode 28 is driven into cut-off, reducing triode 29 to a zero biased condition. When triode 29 is conducting its output current actuates main relay $K_1$. A holding circuit comprising a resistor $R_{16}$ and capacitor $C_3$ is connected across main relay $K_1$ so that upon de-activation of triode 29 the de-activation of main relay $K_1$ will be delayed. Resistor $R_{14}$ connects the triode plate circuit to the B+ voltage source. The contacts of main relay $K_1$ are lettered A, B, C, D and E, and $K_1$, is shown in the inactive state.

When main relay $K_1$ is activated, the actuation of contact $K_{1_E}$ shorts integrating capacitor $C_2$ on integrator 22 to ground, effectively clearing the stage for a later cycle of operation as needed. Contact $K_{1_D}$ removes the cathode of triode 23 from ground and supplies a ground return through resistor $R_{50}$ for the moveable contacts of relay $K_2$ shown in FIG. 3b. The function of triode 53 and its accomplishing relay $K_2$ will be hereinafter more particularly described.

Removing the cathode of triode 23 from ground holds the radar coast and ATI relays 24 and 26 in their activated state regardless of the input from the second detector for the time period in which main relay $K_1$ is energized. Removing the ground from the cathode of triode 53 insures that this tube will have no further control of relay $K_2$ after the slew cycle is initiated. The ground return made available to $K_2$ will be open or will hold $K_2$ energized by completing the B + current loop through relay $K_2$ depending on the state of relay $K_2$'s contacts at the instant of activation of main relay $K_1$.

Closure of contact of $K_{1_C}$ provides the AC excitation circuit to the magnetron tuning drive motor through the contacts of relay $K_3$ and the test-operate switch $S_{2_D}$ and $S_{2_E}$, in a manner to be hereinafter more particularly described. Contacts $K_{1_A}$ when closed apply AC current to the several guide switches as shown in FIG. 3b which are designed to isolate the transmitter energy from the antenna. Relay contact $K_{1_A}$ when closed disconnects the short circuit to ground from capacitor $C_4$, and applies the B + voltage to a contact of relay $K_2$ and to the plate of the thyratron 54 in a manner to be hereinafter more particularly described.

The actuation of relay $K_1$ initiates the AFS operation and activates the timing circuit 14. Upon activation of main relay $K_1$, contact $K_{1_A}$ is coupled to the B+ voltage to thereby provide a pulse to the timing circuit. Vacuum tubes 33 through 46 and their associated circuitry constitute a random time terminating pulse generator. This terminating pulse is designed to initiate the return circuitry to return the radar to normal operation. The sequence of operation of the following circuitry may be more readily understood by reference to the AFS time line chart shown in FIG. 4.

The input to the first timing circuit is a differentiation circuit 31 comprising capacitor $C_4$ and resistors $R_{18}$ and $R_{19}$. This circuit 31 supplies a positive pulse to trigger a minimum time delay multi-vibrator 32. Multi-vibrator 32 is a monostable multi-vibrator having a variable period. The period of this multi-vibrator may be varied incrementally by adjustment of resistor $R_{18}$ which varies the positive potential to the control grid of triode 33. The output, negative pulse of triode 33 is used to trigger a maximum time vibrator 37 into operation.

The output of minimum time vibration 32 enters a differentiation circuit 36 comprising capacitor $C_6$ and resistors $R_{26}$ and $R_{27}$. $R_{26}$ is, again, a variable potentiometer to vary incrementally the period of multi-vibrator 37. The multi-vibrators 32 and 37 have been termed minimum and maximum time multi-vibrators because their function is to set the minimum and maximum time limits for the frequency slew operation. The operation of multi-vibrator 32 determines the minimum time, and the operation of multi-vibrator 37 sets the maximum time. The maximum time multi-vibrator 37 comprises a triode 38 and a triode 39. Upon actuation of the multi-vibrator 32, triode 38 which is normally conducting is cut-off, and triode 39 which has its grid coupled through capacitor $C_7$ to the output of triode 38 is cut-off. During the time interval in which triode 39 is not conducting, coincidence tube 43 is enabled. Thus, through the action of multi-vibrators 32 and 37, the coincidence stage 43 has been enabled for a time $T_1$ plus the minimum delay (where $T_1$ equals the time of actuation of $K_1$) and will remain so enabled for a period of monostable multi-vibrator 37. Since coincidence tube 43 has been enabled during the operation of monostable vibrator 37, the application of a pulse to the quadrature grid of tube 43 at any time during this enabled period will result in cessation of the AFS function established by main relay $K_1$ in a manner to be hereinafter more particularly described.

The second pulse into coincidence tube 43 is supplied from free-running multi-vibrator 44. Multi-vibrator 44 comprises a triode 45 and a triode 46. Resistors 44 and 40 are connected to the grid of triodes 45 and 46, respectively, to provide variable timing control of the multi-vibrator. A trimmer potentiometer 41 provides further timing control. The plate supply for the two triodes 45 and 46 is supplied through resistors $R_{45}$ and $R_{42}$, respectively. Trimmer potentiometer $R_{41}$ serves a balancing function to provide a more equal setting for the conduction of each stage of multi-vibrator 44. It is essential that multi-vibrator 44 and multi-vibrator 37 be adjusted so that the gating pulse generating time of multi-vibrator 37 lasts for a time just exceeding the time interval between each change of state of multi-vibrator 44 to insure that some pulse will be passed through the coincidence stage 41 to terminate the slewing action. On the other hand, the output waveforms of multi-vibrator 44 must be of the same duration, and the multi-vibrator 37 gating pulse cannot appreciably exceed this duration or the random timing will be deteriorated.

Multi-vibrator 44 is connected to an "or" circuit consisting of diodes 51 and 52 and their accompanying circuitry through differentiation circuits 48 and 49. These differentiated voltages cause conduction of their respective halves of the "or" circuitry on the positive pulses. Because of the phase relationship involved, alternate positive voltage surges will occur upon every change of state of multi-vibrator 44 at the cathodes of the respective diodes 51 and 52 in the "or" circuit 50. These pulses are coupled to the quadrature grid of coincidence tube 43 by capacitors $C_{14}$ and $C_{15}$. One such pulse will be passed to the coincidence tube plate only if it happens to be in coincidence with the enabling pulse applied to the limitor grid of tube 43.

Under the circumstances of coincidence, one highly negative going voltage pulse is produced at the plate of tube 43 which is coupled to the grid of triode 29, the main trigger tube, by capacitor $C_8$. This pulse forces the bistable multi-vibrator comprising tubes 28 and 29 to its original (no jamming) state. A short preselected interval of time later, the main relay $K_1$ will be deactivated placing the radar into normal operation.

The tuning actuator circuit for varying the frequency of the transmitter-receiver portion of the radar comprises a polarity selector 53, relay $K_2$, relay $K_3$, and reversing thyratron 54. Polarity selector 53 has its grid coupled to multi-vibrator 44 through resistance $R_{54}$. The output of coincidence tube 43 is connected to the control grid of reversing thyratron 54 through capacitor $C_9$. As can be seen by referring to FIG. 3b, polarity selector 53 will be biased into conduction when multi-vibrator tube 45 is cut-off, and will be cut-off when tube 45 is conducting. Relay $K_2$ is coupled through resistance $R_{53}$ to the plate of polarity selector 53. As a result of this connection, the excitation of relay $K_2$ is controlled by the conduction of triode 53, which in turn is controlled by triode 45 of the free-running multi-vibrator 44. Therefore, the excitation of $K_2$ will cycle at the rate of switching of multi-vibrator 44. The direction of slewing of the magnetron is determined by the state of the relay contacts of $K_2$ at the instant of excitation of $K_1$ in the manner hereinafter to be more particularly described.

As has been previously mentioned, reversing thyratron 54 is actuated by a terminating pulse from coincidence tube 43. Upon firing of reversing thyratron 54 due to a terminating pulse from coincidence tube 43, the "buck-out" coil 56 of relay $K_3$ is excited. The main coil 55 of relay $K_3$ is connected at one side through resistance $R_{58}$ to ground, and at the other side through contact A of relay $K_2$ and contact A of relay $K_1$ either to ground or to the circuit power supply depending upon the excitation of the respective relays. "Buck-out" coil 56 of relay $K_3$ is connected oppositely from main coil 55 on the common core of relay $K_3$. The opposite connection of these two relays results in each coil tending to move the contacts into the opposite state relative to the state of the contacts due to the influence of the other coil. If the contacts of relay $K_3$ are in the activated position immediately prior to energization of the "buck-out" coil, the fields will cancel and the contacts will be forced into the deactivation position. On the other hand, if the contacts are in the deactivation position (that state wherein main coil 55 is not energized), the operation of the "buck-out" coil will serve to move the contacts into the activated position. As a result of the interaction of coils 55 and 56, the connection of the AC excitation voltage to the magnetron tuning motor will be reversed in phase thereby causing the motor to attempt to reverse its direction of rotation. It should be noted that the function of the tuning motor actuator is to cause random direction of rotation of the magnetron tuning motor during the slew cycle, brake the rotation of the motor at the termination of the slewing cycle, and reverse direction of the rotation of the motor when the frequency limit of the magnetron is approached during a slewing interval.

Referring now to FIG. 3c in conjunction with FIG. 3b, it can be seen that the operation of the magnetron tuning drive depends upon operation of a microswitch connected to the terminal E of the output of the slew circuit. The microswitch is actuated by a cam which is placed in a gear box associated with the magnetron tuning drive so that on the approach of the magnetron frequency limit the microswitch will be opened. This action will disconnect the power supply DC voltage from the grid of reversing thyratron resistor $R_{60}$, and, thus, ground the control grid of thyratron 54 through resistor $R_{61}$. Grounding of the control grid of thyratron 54 will cause the tube to ionize and in turn actuate the coils of relay $K_3$ and thereby cause reversing of the direction of rotation of the magnetron tuning motor in the same manner as has been previously discussed with reference to the braking action. When the microswitch is again closed, the negative voltage on the grid of reversing thyratron 54 will not be sufficient to cut-off the tube, so that the magnetron tuning motor will continue to vary the frequency of the transmitter-receiver until relay $K_1$ is de-energized. Upon de-energization of relay $K_1$, voltage will be removed from the magnetron tuning motor drive, but the inertia of the motor will carry the magnetron frequency from the previously approached frequency limit while the radar is actuated. The trigger circuits of the AFS will be open for jamming information as soon as relay $K_1$ is de-activated. Normal braking will be inactive during such a slew interval because the reversing thyratron is already energized at the instant of a braking pulse from coincidence tube 43.

Although the magnetron tuning motor itself has not been shown, the motor contains a drive shaft which turns through nearly 360° between the frequency limits of the magnetron thus making the electro-mechanical reversing system feasible.

If desired, an indicator lamp $I_1$ shown in FIG. 3a may be connected between the plate of main trigger tube 29, and the circuit power supply to indicate when the frequency slew operation is effective. A second indicator lamp $I_2$ may be connected between the plate of reversing thyratron 54 in the circuit power supply through resistor $R_{62}$ as shown in FIG. 3b to indicate initiation of a braking or reversing interval. A third indicator lamp $I_3$ may be provided to indicate the availability of filament voltage to all tubes within the AFS circuit.

In operation, the AFS circuit should be provided with at least a 50% radar receiver on-off duty cycle (receiver on/pulse repetition time) to allow a net charge to be developed across the input integrator networks. In order to provide such a duty cycle, the receiver should be in an unblanked condition at all times. A precision sweep should be made available to the operator displays.

The operation of AFS control circuitry will now be discussed. Upon the incidence of jamming to the radar circuit, a rise in the average operating current will be fed into the video input to the circuit. This rise is impressed across first integrator 21 having a fast time constant and second integrator 22 having a relatively slow time constant. First integrator 21 converts the video input into a direct current level and rapidly throws the radar coast relay 24 and automatic tracking indicator (ATI) relay 26 into operation by means of the rapid cut-off of coast tube 23 which de-activates relay $K_4$. Since second integrator 22 has a relatively long time constant, it will not trigger the modified Eccles-Jordan circuit, composed of tubes 28 and 29, until the process of jamming has persisted in the radar receiver for a sufficiently long period to indicate that spot jamming or an effective rate of swept jamming threatens the radar performance. When it is apparent that effective jamming is present, Eccles-Jordan action insues and main relay $K_1$ is actuated. Upon actuation, main relay $K_1$ performs all the necessary switching functions to initiate AFS operation. The slewing operation is thus begun and the termination of this slewing operation is controlled by the random time control circuitry composed of tubes of 33 through 52 and their accompanying circuitry.

The output pulse of the trigger circuit 13 which actuates relay $K_1$ is coupled through differentiator 31 to trigger minimum time multi-vibrator 32. The output of minimum time multi-vibrator 32 is differentiated and triggers the maximum time gating multi-vibrator 37 at a minimum time interval after actuation of main relay $K_1$. The output of monostable maximum time multi-vibrator 37 enables coincidence stage 41 for the interval of the unstable state of multi-vibrator 37. Coincidence tube 43 is thus capable of generating a pulse upon a second input during this interval.

The output of the "random timing" free-running multi-vibrator 44 is differentiated and coupled through the "or" circuitry 50 to feed a uni-plurality pulse into coincidence stage 41. It should be noted that the provisions of dual diodes 51 and 52 in the "or" circuit allows a pulse to be coupled into coincidence stage 41 upon every change of state of multi-vibrator 44. These pulses are so timed in relation to the maximum time monostable vibrator 37 that only one pulse will be inserted into the coincidence stage 41 during the enabling period. This pulse will, of course, be passed through tube 43 only during its enabling period. The output pulse of coincidence circuit 41 is coupled to the control grid of tube 29 to thereby trigger the Eccles-Jordan circuit into its prejamming state and thus de-activate main relay $K_1$. It should be noted that the holding circuit across relay $K_1$ will delay its de-activation for a predetermined time. Deactivation of relay $K_1$ terminates the automatic frequency slew and returns the radar to its normal operation.

It is to be noted that the time of occurrance of the terminating pulse output of coincidence stage 41 has a random time relationship with respect to the incidence of jamming power. The terminating pulse is random within the limits set up by the minimum and maximum time multi-vibrators 32 and 37 because there is no reference between the instant of receipt of jamming power and the instant of the change of state of the free-running multi-vibrator 44. The minimum time monostable multi-vibrator 32 insures that a certain minimum frequency slew will occur upon the incidence of jamming at any given instant. The maximum time monostable vibrator 37 and coincidence stage 41 insure that frequency slew will be terminated with a given time interval. This time interval is that between minimum time $T_1$ (depending on multi-vibrator 32) and the maximum time, which is $T_1$ plus the period of multi-vibrator 37.

The direction of magnetron frequency slew, motor braking, and frequency limit reversing are determined by free-running multi-vibrator 44, polarity selector 53, relay $K_2$, reversing thyratron 54, relay $K_3$, and the microswitch in the radar transmitter shown in FIG. 3c. Free-running multi-vibrator 44 determines the alternative states of activation of relay $K_2$ by means of polarity selector tube 53 until the instant of actuation of main relay $K_1$. Relay $K_2$ will cycle continuously when power is supplied to the AFS control circuitry except during the slew intervals. Relay $K_2$ is held during the slew intervals in the state of activation existant in the instant of activation of main relay $K_1$ by relay switching action. If relay $K_2$ is activated at the instant of activation of relay $K_1$, the DC power supply voltage applied to the contact of $K_2$ will provide a closed loop through relay $K_2$ and resistor $R_{50}$ to ground maintaining the original excitation of relay $K_2$ through the slew interval. If relay $K_2$ is de-activated at this instant, the cathode of polarity selector 53 is disconnected from ground by relay contact $K_{1_D}$ thereby eliminating tube control of the current in the coil of $K_2$. The DC loop from the circuit power supply through $K_2$ is open due to the de-activated condition of $K_{2_B}$, and, therefore, $K_2$ is maintained in the de-activated condition throughout the slew interval. The state of the contacts of relay $K_2$ determine during the slew interval the state of contacts of relay $K_3$. The activation or de-activation of relay $K_3$ in turn determines the direction of rotation of the magnetron turning motor which determines whether the frequency of the magnetron is increased or decreased during a slew interval.

Upon the incidence of a terminating pulse from coincidence circuit 41, reversing thyratron 54 is ionized and thereby energizes the "buck-out" coil 56 of relay $K_3$. The coils of relay $K_3$ are so wound that the contacts of $K_3$ will reverse their state and impress momentary reverse (braking) torque on the magnetron tuning motor. This torque will cease to exist at the time, after the terminating pulse, that minimum relay $K_1$ is actually de-energized as previously discussed. This time will be adjusted so as to achieve magnetron tuning motor braking. Upon de-activation of relay $K_1$, all voltages are removed from all coils and contacts of relay $K_3$ to thereby place this circuitry in position for actuation on any subsequent cycle of operation.

The microswitch arrangement shown in FIG. 3c is inserted in the magnetron tuning drive assembly so that reversing thyratron 54 is ionized at the instant of the approach of the frequency drive limits to thereby reverse the direction of the frequency slew. It should be noted that such an arrangement precludes braking action at the termination of such a frequency limit reversal operation.

Referring now to the contacts of main relay $K_1$, it can be seen that at the instant $K_1$ is deactivated, $K_{1_A}$ is shorted to ground. At the same instant $K_{1_E}$ removes the short to ground from integrating capacitor $C_2$, $K_{1_D}$ reinserts the polarity reversal tube 54 by returning its cathode resistor 53 to ground, $K_{1_C}$ opens the alternating current path to the contacts $K_3$ thereby removing the energizing voltage from the magnetron tuning drive motor, $K_{1_B}$ removes the alternating current from the waveguide switch so that the radar transmitter is again radiating into space and $K_{1_A}$ provides a ground discharge path for capacitor $C_4$ while, at the same time, removing the direct current power supply from relay $K_2$ thereby de-energizing one or both coils of relay $K_3$ and de-ionizing reversing thyratron 54.

Obviously, many modifications and variations of the present invention are possible in light of the above teachings. It is, therefore, to be understood that within the scope of the appended claims the invention may be practiced otherwise than as specifically described.

What is claimed is:

1. In a system for decreasing the effect of interference signals on radar operation, the combination comprising;

interference signal detection means having a long response time to incoming signals,
   transmitter-receiver frequency slew means,
   trigger means electrically connected to the output of said interference signal detection means and adapted to actuate said frequency slew means upon receipt of a predetermined level of output from said detection means,
   timing means electrically connected to be actuated by said trigger means for controlling the time of operation of said frequency slew means, and
   free-running multi-vibrator means electrically connected to and adapted to cooperate with said timing means to control the operation of said frequency slew means,
   whereby said automatic frequency slew means is actuated upon receipt of an effective interference signal, and operates to change the frequency of said transmitter-receiver to eliminate the effect of interference signals.

2. The combination such as that defined in claim 1 wherein said interference signal detection means includes;

integrator means having a long time constant, said integrator means being electrically connected to the input of the system, and adapted to provide an output signal representative of the interference signal average power level, and actuation means responsive to the output of said integrator means to actuate said frequency slew means in response to the interference signal average power level.

3. The combination such as that defined in claim 2 wherein;

said trigger means includes multi-vibrator means electrically connected to the output of said second integrator means and adapted to be controlled thereby, and first relay means electrically connected to the output of said multi-vibrator means for controlling the excitation of said frequency slew means.

4. The system sych as that defined in claim 3 wherein said timing means includes;

a minimum time multi-vibrator, a maximum time multi-vibrator, and a coincidence circuit, said minimum time multi-vibrator being electrically connected to the output of said trigger means whereby it is actuated when the interference input signal actuates said trigger means, said maximum time multi-vibrator being electrically connected to the output of said minimum time multi-vibrator and adapted to be actuated thereby, said coincidence circuit being electrically connected to said maximum time multi-vibrator to provide a control valve for passage of signals from said free-running multi-vibrator, whereby said minimum time multi-vibrator and said maximum time multi-vibrator provide a time interval for operation of said frequency slew means, and said coincidence circuit is enabled for the period of operation of said minimum and maximum time multi-vibrators.

5. A system such as that defined in claim 4 including;

an "or" circuit connected to the output of said free-running multi-vibrator means to provide a path for the output of said free-running multi-vibrator means to said coincidence circuit, whereby a signal is provided at the output of said coincidence circuit to control the operation of said frequency slew means.

6. A system such as that defined in claim 5 wherein said frequency slew means comprises;

a transmitter-receiver magnetron tuning device for varying the frequency of the radar transmitter-receiver, a slew motor operably connected to said magnetron tuning drive to actuate said tuning drive, said first relay being operable to connect said slew motor to a source of alternating current when said relay is actuated whereby said slew motor is actuated upon receipt of interference at the input of said system.

7. A system such as that defined in claim 6 including;

polarity selector means electrically connected to the output of said free-running multi-vibrator means and to said slew motor for controlling the direction of rotation of said slew motor when said frequency slew system is actuated.

8. A system such as that defined in claim 7 wherein; said polarity reversal means includes, a vacuum tube having its control grid electrically connected to the output of said free-running multi-vibrator means whereby the conduction of said vacuum is controlled by said free-running multi-vibrator means, a second relay connected to the plate circuit of said vacuum tube, said second relay having a plurality of contacts part of which are connected to a contact of the first relay whereby upon actuation of said first relay, the contacts of said second relay are maintained in a fixed position, and connecting means electrically connecting the cathode of said vacuum tube to a contact of said first relay whereby upon actuation of said first relay said cathode is open-circuited so that said vacuum tube thereafter has no control over said second relay.

9. A system such as that defined in claim 7 including;

reversing means for reversing the direction of rotation of said slew motor.

10. The combination as defined in claim 9 wherein;

said reversing means includes, actuating means controlled by said magnetron tuning drive and said coincidence means whereby said slew motor is reversed when the frequency limit of the magnetron is reversed, and said slew motor's rotation is braked when a terminating signal is emitted from said coincidence means.

11. The combination as defined in claim 10 wherein; said reversing means includes, a thyratron, a third relay and a microswitch, said thyratron having a control grid electrically connected to the output of said coincidence means and to said microswitch, said microswitch being operably connected to said magnetron tuning drive, whereby said thyratron is adapted to be ionized by a terminating signal from said coincidence means and by operation of said microswitch due to the rotation of said magnetron tuning drive, said third relay being operably connected to said thyratron, and to a source of direct current through said first and second relays so that upon ionization of said thyratron, the direction of rotation of said slew motor is reversed.

12. In a system for decreasing the effect of interference signals on radar operation, the combination comprising;

first interference detection means for measuring the average power level of incoming interference signals, second interference detection means connected to the input of said system for measuring the average power level of incoming interference signals, said first interference detection means having a short response time to incoming signals, and said second interference detection means having a slow response time to incoming signals, coast means and automatic track indicator means electrically connected to and adapted to be actuated by said first interference signal detection means whereby the radar is rendered insensitive to interference signals when the average power level of the interference signals reaches a predetermined power level and the target positional information is preserved while the coast means is in operation, frequency slew means operably connected to said second interference signal detection means for changing the frequency of operation of the radar upon detection of effective interference signals by said second interference detector.

13. The combination as defined in claim 12 wherein said first interference detection means comprises;
   integrator means for receiving the interference signals from the radar system, and for averaging the power level of the signals,
   electronic valve means connected to the output of said integrator means and adapted to be controlled thereby, whereby said electronic valve means becomes non-conducting when the average power level of the interference signals reaches a predetermined magnitude, and
   actuation means connected to the output of said electronic valve means and actuating said coast and said automatic track indicator means in response to the output of said integrator means.

14. The combination as defined in claim 12 wherein said automatic frequency slew means comprises;
   trigger means electrically connected to the output of said second interference detection means for initiating a frequency slew operation when the incoming interference reaches a predetermined level,
   timing means connected in series with the output of said trigger means and adapted to be actuated thereby for determining the maximum and minimum time of operation of frequency slew means, and
   frequency slew direction control means connected to said timing means and said trigger means for controlling the direction and rate of slew of said frequency slew means.

15. The combination as defined in claim 14 wherein said timing means comprises;
   a minimum time multi-vibrator connected in series with said trigger means for establishing the minimum time of operation of said frequency slew means,
   maximum time multi-vibrator means electrically connected to the output of said minimum time multi-vibrator means and adapted to be actuated thereby for establishing the maximum time of operation of said frequency slew means,
   coincidence means having a control means electrically connected to the output of said maximum time multi-vibrator means for providing a path for a terminating pulse to terminate said frequency slew operation, and
   random time free-running multi-vibrator means having its output coupled to said coincidence means for providing a random pulse to said coincidence means when it is rendering conductive to thereby terminate the frequency slew operation.

16. The combination as defined in claim 15 wherein said frequency slew direction control means comprises;
   polarity selector means connected to the output of said free-running multi-vibrator means and controlled thereby for controlling the direction of frequency slew upon actuation of frequency slew means, and
   reversing means connected to the output of said coincidence means and to a frequency slew motor whereby the direction of rotation of a frequency slew motor is reversed when a terminating pulse issues from said coincidence means, and when the frequency limit of the radar is approached during the slewing operation.

* * * * *